United States Patent
Fly et al.

(10) Patent No.: US 7,940,210 B2
(45) Date of Patent: May 10, 2011

(54) INTEGRITY OF DIFFERENTIAL GPS CORRECTIONS IN NAVIGATION DEVICES USING MILITARY TYPE GPS RECEIVERS

(75) Inventors: Brian E. Fly, Clearwater Beach, FL (US); Kenneth S. Morgan, St. Petersburg, FL (US); James D. Waid, Bradenton, FL (US); Martin P. Ignac, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 421 days.

(21) Appl. No.: 12/147,410

(22) Filed: Jun. 26, 2008

(65) Prior Publication Data

US 2009/0322598 A1    Dec. 31, 2009

(51) Int. Cl.
*G01S 19/27* (2010.01)
*G01S 19/41* (2010.01)

(52) U.S. Cl. ......... 342/357.24; 342/357.44; 342/357.66; 340/539.13

(58) Field of Classification Search ............. 342/357.23, 342/357.24, 357.44, 357.62–357.64, 357.66; 340/539.13; *G01S 19/27, 19/41*
See application file for complete search history.

(56) References Cited

U.S. PATENT DOCUMENTS

| | | | |
|---|---|---|---|
| 5,596,328 A | 1/1997 | Stangeland | |
| 5,760,737 A | 6/1998 | Brenner | |
| 5,936,573 A | 8/1999 | Smith | |
| 6,285,315 B1 * | 9/2001 | Pratt | 342/357.42 |
| 6,943,729 B2 * | 9/2005 | Dobson | 342/387 |
| 7,219,013 B1 | 5/2007 | Young et al. | |
| 7,298,289 B1 * | 11/2007 | Hoffberg | 340/903 |
| 7,564,406 B2 * | 7/2009 | Han | 342/357.66 |
| 2003/0055562 A1 | 3/2003 | Levy et al. | |
| 2004/0006424 A1 * | 1/2004 | Joyce et al. | 701/207 |
| 2004/0220733 A1 | 11/2004 | Pasturel et al. | |
| 2004/0225432 A1 * | 11/2004 | Pilley et al. | 701/117 |
| 2006/0071849 A1 * | 4/2006 | Howle et al. | 342/357.08 |
| 2009/0121927 A1 * | 5/2009 | Moshfeghi | 342/357.03 |

OTHER PUBLICATIONS

European Patent Office, "European Search Report", Oct. 19, 2009, Published in: EP.

* cited by examiner

*Primary Examiner* — Thomas H Tarcza
*Assistant Examiner* — John B Vigushin
(74) *Attorney, Agent, or Firm* — Fogg & Powers LLC

(57) ABSTRACT

A method and apparatus for calculating corrections to a navigation solution based on differential GPS data includes receiving GPS ephemeris from at least three GPS satellites. A PVT solution is resolved from the GPS ephemeris. The PVT solution includes a Circular Error Probable (CEP). Differential GPS data for calculating the corrections to the PVT solution is received. A corrected PVT solution is then based upon the differential GPS data. The corrected PVT solution is compared to an area defined by the CEP. Where the corrected PVT solution is not within the area, the corrected PVT solution is rejected in favor of the PVT solution for determining an accurate navigational solution.

10 Claims, 2 Drawing Sheets

INTEGRITY OF DIFFERENTIAL GPS CORRECTIONS IN NAVIGATION DEVICES USING MILITARY TYPE GPS RECEIVERS

BACKGROUND OF THE INVENTION

GPS satellites broadcast navigation data which are modulated on the L1 and L2 carrier frequencies. The data contains coarse ephemeris data (referred to as almanac data) for all satellites in the constellation, precise ephemeris data for this particular satellite, and timing data and model correction parameters needed by a GPS receiver to make a correct ranging measurement. The satellites also broadcast these two forms of ranging codes: the Coarse/Acquisition code (C/A), which is freely available to the public, and the restricted Precise code (P-code), which is usually reserved for military applications.

GPS receivers receive the ephemeris data to know the precise time. Using that time, they calculate position, velocity, and time solutions (PVT) correctly. For this reason, the satellites are equipped with extremely accurate atomic clocks. Most receivers use an internal crystal oscillator-based clock that is continually updated using the signals from the satellites.

The receiver identifies each satellite's signal by its distinct C/A code pattern and then measures the time delay in generating that C/A code pattern for each satellite. To do this, the receiver produces an identical C/A sequence using the same seed number as the satellite. By lining up the two sequences, the receiver can determine a pseudorange, the measurement of delay and calculation of the distance to the satellite.

Calculating a position with the P(Y) signal is conceptually similar in that a receiver must first decrypt the signal, then use information in the navigation data to know where in the week-long pseudorandom noise (PRN) sequence the satellite is currently broadcasting. Once this is known, tracking and measurement are the same. The encryption of P code into Y code is essentially a security mechanism; it is reasonable to assume that if a signal can be successfully decrypted, it is a real signal being sent by a GPS satellite and not a "spoofed" signal. In contrast, civil receivers are highly vulnerable to spoofing, since correctly formatted C/A signals can be generated using readily available signal generators.

A GPS receiver, however, can never measure exact range to each satellite. The measurement process is corrupted by noise which introduces errors into the calculation. This noise includes errors in the ionospheric corrections and system dynamics not considered during the measurement process (e.g., user clock drift). A Kalman filter characterizes the noise sources in order to minimize their effect on the desired receiver outputs.

When the GPS receiver is aided or integrated with other navigation sensors (e.g., inertial navigation sensors ("INS"), clock, or altimeter), then the Kalman filter can be extended to include the measurements added by these sensors. For more accurate position measurements, a user receiver receives deviation information from a reference receiver and thereby to provide differential correction to the user receiver. A system using a user receiver with one or more reference receivers is referred to as Differential GPS (DGPS). Examples of differential reference systems are RTCM, StarFire, WAAS, LAAS, EGNOS, and MSAT.

The idea of differential positioning is to correct range bias errors at the mobile receiver location with the observed range bias errors at a known position. The reference station computes corrections for each satellite signal. DGPS implementations require software in the reference receiver that can track all "visible" satellites and form pseudo-range corrections. These corrections are transmitted to the user receiver that has to apply these corrections to the pseudorange measurement for each satellite used in the navigation solution. In this case, the reference receiver has limited effect at useful ranges because both receivers would have to be using the same set of satellites to resolve their navigation solutions.

Current DGPS systems may be "spoofed" with erroneous data from the reference receiver that will confuse the DGPS receiver. When the DGPS receiver receives erroneous data, that data can cause the DGPS receiver to report position or velocity vectors that contain hazardously misleading errors with respect to the true values of the vectors. In short, the DGPS may produce a value for either or both vectors that is less accurate than those reported by the non-differential GPS.

There is a need for a DGPS system that suitably sorts the received reference signals to derive a best available GPS solution.

SUMMARY OF THE INVENTION

A method and apparatus for calculating corrections to a navigation solution based on differential GPS data includes receiving GPS ephemeris from at least three GPS satellites. A PVT solution is resolved from the GPS ephemeris. The PVT solution includes a Circular Error Probable (CEP). Differential GPS data for calculating the corrections to the PVT solution is received. A corrected PVT solution is then based upon the differential GPS data. The corrected PVT solution is compared to an area defined by the CEP. Where the corrected PVT solution is not within the area, the corrected PVT solution is rejected in favor of the PVT solution for determining an accurate navigational solution.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
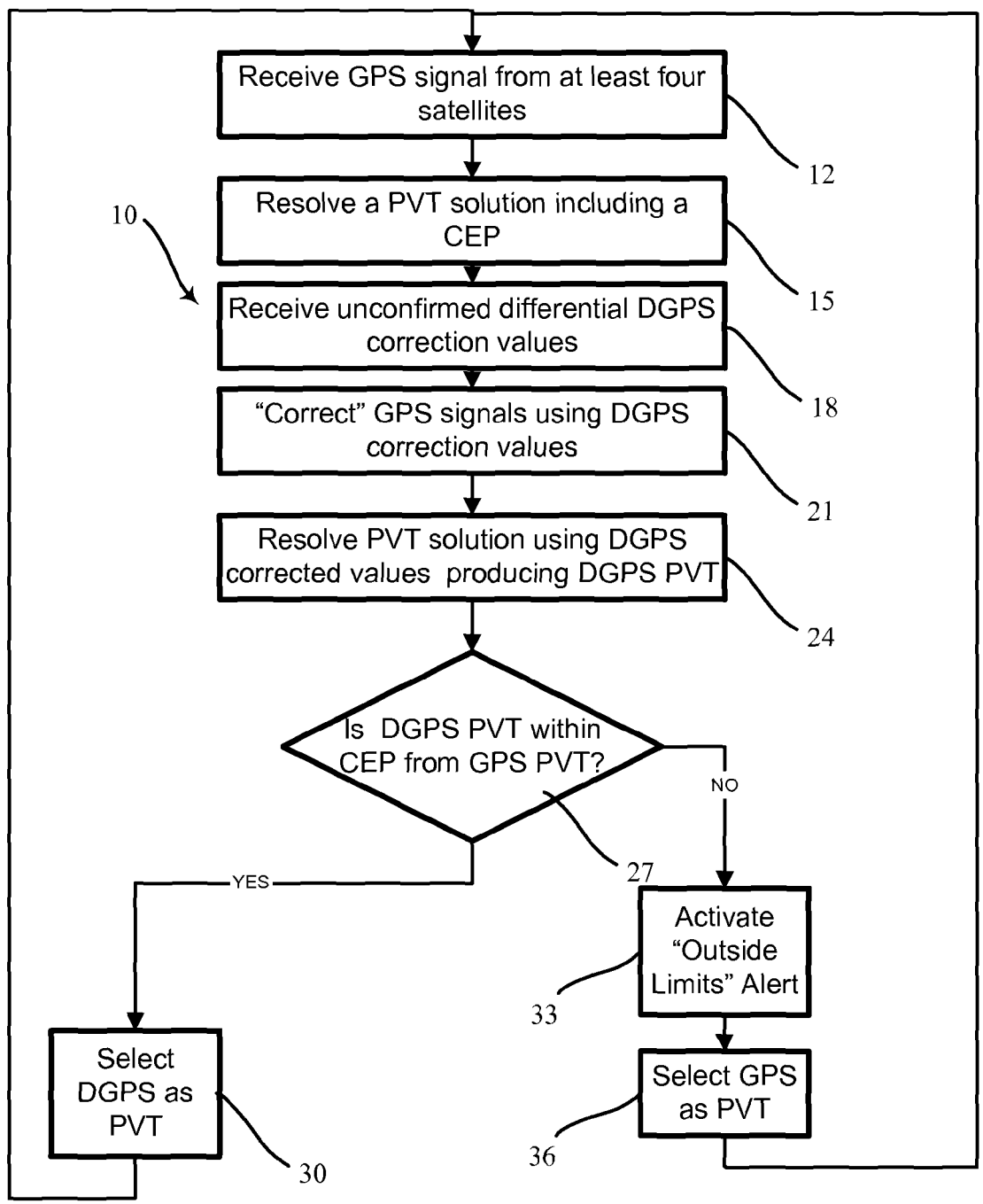
FIG. 1 is a flow chart of a method for developing a reliable GPS PVT solution based upon suspect DGPS correction data.

FIG. 1 depicts a flow chart indicating a method 10 of selectively resolving a GPS signal based upon suspect differential corrections. The method 10 may, in a non-limiting embodiment be based upon the reception of P-code but in another embodiment may be based upon reception of the relatively simple C/A code. In either instance, at least four GPS signals received at a block 12.

In either nonlimiting embodiment, the GPS signals received at the block 12 are resolved to develop a position, velocity, and time solution that will also include a Circular Error Probable (CEP) at a block 15. The CEP is a statistical measure of horizontal precision accuracy. CEP is defined as the radius of a circle (centered on the true position) that contains 50% of the reported positions. In a distinct embodiment, rather than using the CEP, designated horizontal and vertical limits may be used to develop acceptable limits in accord with the discussion set out below.

In another nonlimiting embodiment, a Horizontal Uncertainty Level ("HUL") (set forth in U.S. Pat. No. 5,760,737 to Brenner, dated Jun. 2, 1998 and incorporated by this reference) is used to develop a suitable threshold for a measured appropriate uncertainty. The HUL is a statistical measure of horizontal precision accuracy. HUL is defined as the radius of a circle (centered on the true position) that contains 99.9% of the reported positions." In using the HUL, many fewer FALSE detections occur than by use of the CEP making the HUL the presently preferred embodiment.

A Kalman filter is used to resolve the received signals. In one embodiment, GPS and Inertial Navigation Systems (INS) are used for position and velocity determination applications. When combined together, GPS and INS provide many complimentary characteristics that overcome the limitations experienced when using each sensor individually. GPS and INS sensors are typically combined using a Kalman filter. There are principally two ways GPS and INS data can be combined. They are commonly known as loosely and tightly coupled systems. In a loosely coupled system, two processes must be performed sequentially. Firstly, the GPS data must be processed in its own Kalman filter. The output position and velocity information can then be used in a separate filter when processing the inertial data, and is used to bind the INS measurement error growth. The major advantage to a loosely coupled system is its design simplicity relative to a tightly coupled system.

A tightly coupled system integrates both GPS and INS measurements into a single Kalman filter. This has several theoretic advantages over a loosely coupled system. Firstly, any number of GPS measurements may be used in the filter, therefore even if just one satellite is being tracked, that data can be used within the filter to help bind INS error growth. Additionally, it is possible that cycle slips may be fixed in GPS data. The disadvantage to such a system is the complexity of the design and the ability to make such a system functional in practice.

The Kalman filter requires a dynamic model to describe the way in which the errors develop over time and the selection of a best PVT solution inherently weights the system to reject bad correction data. The Kalman filter is a linear, recursive estimator that produces the minimum variance estimate in a least squares sense under the assumption of white, Gaussian noise processes. Because the filter is a linear estimator by definition, for navigation systems it generally estimates errors in the total navigation state. The Kalman filter also produces a measure of the accuracy of its error state vector estimate. This level of accuracy is the matrix of second central moments of the errors in the estimate and is defined as the covariance matrix.

There are two basic processes that are modeled by a Kalman filter. The first process is a model describing how the error state vector changes in time. This model is the system dynamics model. The second model defines the relationship between the error state vector and any measurements processed by the filter and is the measurement model.

Intuitively, the Kalman filter sorts out information and weights the relative contributions of the measurements and of the dynamic behavior of the state vector. The measurements and state vector are weighted by their respective covariance matrices. If the measurements are inaccurate (large variances) when compared to the state vector estimate, then the filter will deweight the measurements. On the other hand, if the measurements are very accurate (small variances) when compared to the state estimate, then the filter will tend to weight the measurements heavily with the consequence that its previously computed state estimate will contribute little to the latest state estimate.

Thus at the block 15, by either of the GPS alone or GPS/INS systems, a PVT solution is derived.

In accord with any of a non-limiting set of differential GPS systems such as StarFire, RTCM, WAAS, LAAS, EGNOS, or MSAT, correction data is received that correlates with each of the satellites used to develop the GPS PVT solution at a block 18. At a block 21, the satellite signals are corrected in accord with the received correction data. At a block 24, the corrected data are used in a similar manner as the uncorrected data are used in the block 15 to develop a DGPS PVT solution.

At a block 27, the DGPS PVT solution is compared to the area around the GPS PVT solution enclosed by the CEP. If the DGPS PVT solution is within the area defined by the CEP, the DGPS correction data is presumed to be good or free from "spoofing" and a new position for the user receiver is based upon the DGPS PVT at a block 30. The DGPS PVT solution is then fed into the Kalman filter as the current position for developing the next iteration. The method then repeats.

Where the DGPS PVT solution is outside of the area defined by the CEP, the DGPS correction data is presumed to be either intentionally or unintentionally "spoofed." Because of the detected "spoofing" at a block 33, an indicator that the DGPS data has been spoofed is activated. In various non-limiting embodiments, the indicator may be as simple as a lamp or some sort of enunciator, or it may be a flag on the data that is provided downstream to a flight management system. In one embodiment, the color of a position icon on a map may shift from one color indicating greater confidence to a second color indicating lesser confidence in the position the icon portrays.

Because the DGPS correction data is presumed "spoofed," the DGPS PVT solution is rejected in favor of the GPS PVT solution. The GPS PVT solution is then fed into the Kalman filter as the current position for developing the next iteration. The method then repeats.

Figure 2:
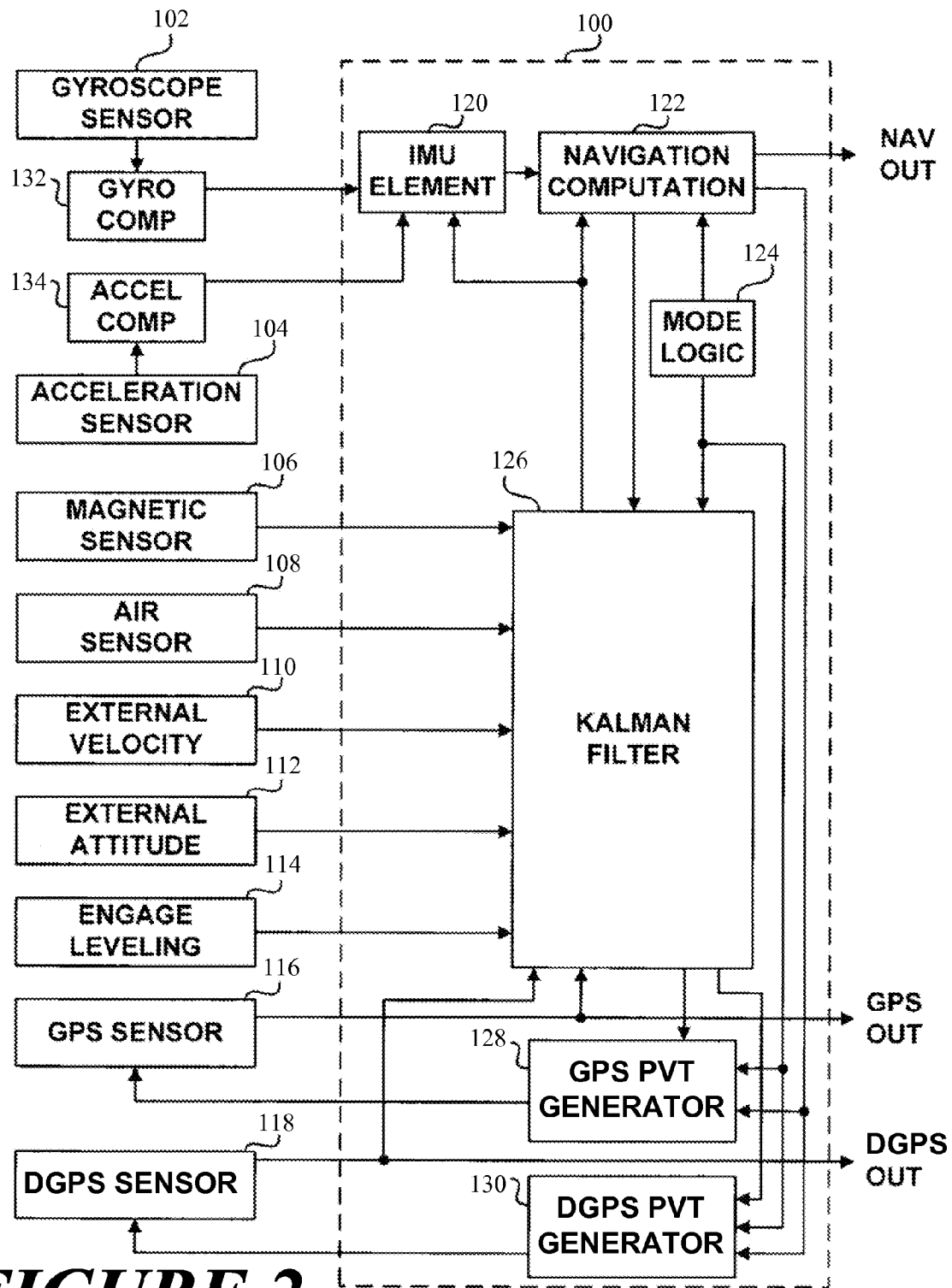
FIG. 2 is a block diagram of an apparatus for developing a reliable GPS PVT solution based upon suspect DGPS correction data.

FIG. 2 depicts a block diagram of a system processor 100 according to a nonlimiting exemplary embodiment. The system processor 100 may include an IMU compensation element 120, a navigation computation element 122, mode logic 124, a Kalman filter 126, and two Position Velocity and Time (PVT) solution generators exist for the development of a PVT solution as well as the development of a CEP. The GPS PVT solution generator 128 resolves a PVT solution without the use of the differential GPS data while the DGPS PVT solution generator 130 resolves a solution with the available DGPS data from a DGPS data source such as RTCM, StarFire, WAAS, LAAS, EGNOS, and MSAT.

In the nonlimiting embodiment each of the GPS PVT solution generator 128 and DGPS PVT solution generator 130 resolve PVT solutions in parallel while using a single Kalman filter 126. An integrated PVT solution hardware piece could also be used as could dual Kalman filters to distinctly resolve PVT solutions with each of the GPS data and the available DGPS data. Accordingly, different configurations of PVT solution generators may be located in the system processor 100. Alternatively, the PVT solution generators 128, 130 may be located outside the system processor 100. The system processor 100 may include additional elements not depicted in FIG. 2 as well. In an alternative embodiment, the IMU compensation element 120 may be partially or completely located outside of the processor 100.

The system processor 100 may receive a variety of data from a variety of sources. The system processor 100 may receive the following types of data: compensated or uncompensated gyroscope data, compensated or uncompensated acceleration data, magnetic data, air data, external velocity data 110, external attitude data 112, and GPS data, otherwise referred to as sensor data.

The external velocity data 110 and the external attitude data 112 may be provided by other inertial navigation systems on the aircraft, such as an aircraft INS. The external velocity data 110 may indicate the velocity of the aircraft, including when the velocity of the aircraft is zero (i.e., stationary). Further, the external velocity data 110 may be calculated as a conventional velocity measurement or as a conventional change in position over a specified time period (e.g., the Kalman filter interval).

The system processor 100 may receive sensor data from the following sensors: gyroscope sensors 102, acceleration sensors 104, magnetic sensors 106, air sensors 108, a GPS sensor 116, and a DGPS sensor 118. While one GPS sensor is depicted in FIG. 2 more than one GPS sensor may provide GPS data to the system processor 100. The system processor 100 may receive additional data as well, such as data from an odometer. Additionally, the system processor may receive an indication of whether or not to engage leveling 114. The indication of whether or not to engage level 114 may be based on time since an aid became unavailable or on the Kalman filter 126 covariances.

The sensors 102-108, 116, and 118 may sense the state of the vehicle. Gyroscope electronics 132 may convert data from the gyroscope sensors 102 into a digital representation of the gyroscope data prior to sending the gyroscope data to the system processor 100. Likewise, accelerometer electronics 134 may convert data from the acceleration sensors 104 into a digital representation of the acceleration data prior to sending the acceleration data to the system processor 100.

The system processor 100 may provide as an output a navigation solution. The navigation solution may be a three-dimensional position, three-dimensional velocity, and three-dimensional attitude solution. However, the exact navigation solution may depend on the operational mode of the aircraft. Additionally, the system processor 100 may provide GPS outputs. The GPS outputs may be the data obtained from the GPS sensor 116 and the DGPS sensor 118, with or without additional processing from the system processor 100. Additional outputs are also possible. Other avionics systems may use the navigation solution and the GPS outputs. For example, the aircraft's position may be displayed for the pilot on a head-up display.

The IMU element 120 may receive the data from the gyroscope electronics 132 and the acceleration electronics 134. The combination of the gyroscope electronics 132 and the acceleration electronics 134 may be substantially the same as the inertial electronics 116 as depicted in FIG. 1. The IMU element 120 may provide compensation that uses information from multiple sensors (e.g., three accelerometers and three gyroscopes) to compensate one or more of the inertial sensors. For example, the IMU element 120 may compensate for coning, sculling, or gravitational effects.

Additionally, the Kalman filter 126 may provide estimates of gyroscope and accelerometer errors to the IMU element 120 or to the navigation solution. Inertial navigation systems experience drifts over time, which causes errors in the position, velocity, and attitude solutions. The errors may be caused by gyroscope drift, accelerometer bias, scale factor errors, and other error sources. The navigation corrections provided by the Kalman filter 126 may correct the errors in the navigation solution caused by these errors. The IMU element 120 may provide compensated IMU data to the navigation computation element 122.

The navigation computation element 122 may be software capable of blending the IMU data received from the IMU element 120 and the navigation corrections provided by the Kalman filter 126 to produce a navigation solution. The navigation computation element 122 may calculate the navigation solution by numerically solving Newton's equations of motion using the data received from the IMU element 120 and the Kalman filter 126. The navigation solution may be referenced to a navigation coordinate frame. Possible navigation coordinate frames include earth centered inertial (ECI), earth centered earth fixed (ECEF), local level with axes in the directions of north, east, down (NED), and local level with a wander azimuth.

Additionally, the navigation computation element 122 may provide the navigation solution to the Kalman filter 126. The Kalman filter 126 may use the navigation solution to calculate estimates of future calculated navigation solutions. In this manner, the Kalman filter 126 may provide a recursive method of calculating the errors in the sensors used to compute the navigation solution.

The navigation computation element 122 may also receive an input from the mode logic 124. The mode logic 124 may indicate whether or not the GPS PVT generator 128 should provide a navigation solution without reference to the DGPS PVT generator 130. The DGPS PVT solution generated at the DGPS PVT generator 130 is compared to an area around the GPS PVT solution enclosed by a CEP generated at the GPS PVT generator 128. If the DGPS PVT solution is within the area defined by the CEP, the DGPS correction data is presumed to be good or free from "spoofing" and the Kalman Filter 126 derives a new position for the user receiver is based upon the DGPS PVT generator 130. The DGPS PVT solution is then fed into the Kalman filter as the current position for developing the next iteration. The method then repeats.

Where the DGPS PVT solution is outside of the area defined by the CEP, the DGPS correction data is presumed to be either intentionally or unintentionally "spoofed" at the mode logic 124. Because of the detected "spoofing" at the mode logic 124, an indicator that the DGPS data has been spoofed may be activated. In various non-limiting embodiments, the indicator may be as simple as a lamp or some sort of enunciator or it may be a flag on the data that is provided downstream to a flight management system. In one embodiment, the color of a position icon on a map may shift from one color indicating greater confidence to a second color indicating lesser confidence in the position the icon portrays.

Additional nonlimiting embodiments may include an indicator that flags the solution or includes a position uncertainty measurement. By so flagging or by including the position uncertainty measurement, a host system (such as an FMS) may determine whether the solution is "good enough" given the current flight state. For example, a position uncertainty might, in one embodiment allow the DGPS to determine whether or not the provided solution is appropriate for use to determine position relative to the terrain in level flight while the same solution may not be appropriate during landing operations. Still other embodiments might selectively use GPS solutions selectively when positional uncertainty exceeds a designatable threshold.

Because the DGPS correction data is presumed "spoofed," the DGPS PVT solution is rejected in favor of the GPS PVT solution generated at the GPS PVT generator 128. The GPS PVT solution is then fed into the Kalman filter as the current position for developing the next iteration. The method then repeats.

The mode logic 124 may be any combination of hardware, firmware, or software that is operable to determine whether a navigation solution should be provided, and if so, what type of navigational solution should be provided. For example, the aircraft may be in stand-by mode and not require a navigation solution. However, if the aircraft is in navigation mode, the mode logic 124 may determine whether the navigation solution should be based on the deeply integrated mode or the aiding mode.

The Kalman filter 126 may be any combination of hardware, firmware, or software operable to provide an estimate. Kalman filters are well known in the art for use in providing correction data to a navigation computation element to provide a more accurate navigation solution. The Kalman filter 126 may receive data from the sensors and estimate navigation corrections of the aircraft's position, velocity, or attitude. The Kalman filter 126 may estimate navigation corrections using a model of the INS error dynamics. The Kalman filter 126 may provide the estimate to the IMU element 120, the navigation computation element 122, and the PVT solution generators 128, 130.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system processor for a navigation system, comprising:
   a GPS ranging system operable to receive GPS ephemeris from at least three GPS satellites;
   a DGPS data receiver operable to receive differential GPS data for correction of the GPS ephemeris;
   at least one Kalman filter operating alone or in combination, the at least one Kalman filter operable to calculate a navigation solution based on the GPS ephemeris received by the GPS ranging system and to calculate a corrected navigation solution based upon the differential GPS data, wherein the Kalman filter uses the differential GPS data;
   a mode logic operable to calculate the navigation solution and operable to determine whether to select the navigation solution based upon the GPS ephemeris or the corrected navigation solution.

2. The system of claim 1, wherein the mode logic includes activation of an alert signal.

3. The system of claim 2, wherein the alert signal includes modifying an icon on a display.

4. The system of claim 2, wherein the alert signal includes a light.

5. The system of claim 1, wherein the navigation solution includes a three-dimensional position, three-dimensional velocity, and three-dimensional attitude solution.

6. A method of calculating corrections to a navigation solution based on accurate data, comprising:
   receiving GPS ephemeris from at least three GPS satellites;
   resolving a PVT solution from the GPS ephemeris, the PVT solution including a CEP, wherein the CEP is based on the PVT solution;
   receiving differential GPS data for calculating the corrections to the PVT solution;
   calculating a corrected PVT solution based upon the differential GPS data;
   comparing the corrected PVT solution to an area defined by the CEP; and
   determining whether to select the PVT solution based on the GPS ephemeris or the corrected PVT solution based on the differential GPS data.

7. The method of claim 6, wherein the rejecting of the corrected PVT solution includes activating an alert.

8. The method of claim 7, wherein the activating of an alert includes modifying an icon in a display.

9. The method of claim 7, wherein the activating of an alert includes generation of a display including words and figures indicative of rejection of the differential GPS data.

10. The method of claim 7, wherein the activation of an alert includes an aural alert.

* * * * *